US012775084B2

(12) United States Patent
Krajnc et al.

(10) Patent No.: US 12,775,084 B2
(45) Date of Patent: Oct. 27, 2026

(54) RADIO FREQUENCY SENSING SYSTEM

(71) Applicant: SIGNIFY HOLDING B.V., Eindhoven (NL)

(72) Inventors: Hugo José Krajnc, Eindhoven (NL); Paul Henricus Johannes Maria Van Voorthuisen, Sint Oedenrode (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 410 days.

(21) Appl. No.: 18/274,014

(22) PCT Filed: Jan. 21, 2022

(86) PCT No.: PCT/EP2022/051352
§ 371 (c)(1),
(2) Date: Jul. 25, 2023

(87) PCT Pub. No.: WO2022/157315
PCT Pub. Date: Jul. 28, 2022

(65) Prior Publication Data

US 2024/0426999 A1 Dec. 26, 2024

Related U.S. Application Data

(60) Provisional application No. 63/141,250, filed on Jan. 25, 2021.

(30) Foreign Application Priority Data

Feb. 2, 2021 (EP) .................................... 21154653

(51) Int. Cl.
*G01S 13/56* (2006.01)
*G01S 7/00* (2006.01)
(Continued)

(52) U.S. Cl.
CPC .............. *G01S 13/56* (2013.01); *G01S 7/006* (2013.01); *G01S 7/4091* (2021.05); *G01S 13/878* (2013.01); *H04W 4/33* (2018.02)

(58) Field of Classification Search
CPC ...... G01D 21/02; G01J 5/0025; G01S 5/0263; G01S 7/006; G01S 7/40; G01S 7/4091;
(Continued)

(56) References Cited

U.S. PATENT DOCUMENTS 9,213,081 B2 * 12/2015 Tarlow .................... H04W 4/20
9,523,760 B1 * 12/2016 Kravets .................. G01S 13/04
(Continued)

FOREIGN PATENT DOCUMENTS

JP 2013065452 A 4/2013
JP 2019032891 A 2/2019
(Continued)

*Primary Examiner* — Stephen R Burgdorf

(57) ABSTRACT

A radio frequency (RF) sensing system (10) is provided and comprises RF sensing nodes (200) having a RF node transceiver (210), and a node controller (220) with a RF sensing controller (223) sensing RF signals from other RF nodes (200). A controller (100) comprises a mode controller (120) having a calibration mode controller (122). In a calibration mode the calibration mode controller (122) analyzes metadata from the RF sensing nodes (200) to select a number of RF sensing nodes (200) from among the RF sensing nodes for performing RF sensing based on the analyzed metadata. The calibration mode controller (122) is outputs instructions to a user device (300) to instruct a user to perform activities or movements to enable a calibration of the RF sensing nodes (200) by analyzing the RF signals detected by the RF sensing nodes (200) during the activities or the movements of the user.

18 Claims, 2 Drawing Sheets

(51) Int. Cl.

| | |
|---|---|
| ***G01S 7/40*** | (2006.01) |
| ***G01S 13/87*** | (2006.01) |
| ***H04W 4/33*** | (2018.01) |

(58) Field of Classification Search

CPC ........ G01S 13/003; G01S 13/04; G01S 13/42; G01S 13/56; G01S 13/878; G05B 15/02; G06F 11/3006; G06F 30/13; G08B 29/16; H04B 1/0064; H04B 10/116; H04B 17/102; H04B 17/318; H04L 12/12; H04L 41/0816; H04L 63/1416; H04Q 9/00; H04Q 2209/25; H04Q 2209/43; H04W 4/029; H04W 4/33; H04W 16/10

USPC ........................................................ 340/539.23

See application file for complete search history.

(56) References Cited

U.S. PATENT DOCUMENTS 10,404,387 B1 9/2019 Devison et al.
2008/0318689 A1* 12/2008 Rofougaran .......... A63F 13/235 463/42
2012/0146788 A1 6/2012 Wilson et al.
2015/0373692 A1* 12/2015 Jern ...................... H04W 4/023 370/329
2016/0127931 A1* 5/2016 Baxley ...................... G06T 7/60 455/67.16
2016/0182641 A1 6/2016 Maman et al.
2016/0364913 A1* 12/2016 Montaigne ............ G06T 19/006
2017/0013207 A1* 1/2017 Manku ............... G01R 29/0878
2017/0127241 A1* 5/2017 Sjölund ............... G01S 5/02213
2017/0366938 A1 12/2017 Wootton et al.
2018/0233145 A1* 8/2018 Bathiche ............... H04L 63/102
2020/0096345 A1 3/2020 Jadav et al.
2020/0196104 A1* 6/2020 Wirola .................. H04W 4/021

FOREIGN PATENT DOCUMENTS

WO 2017100706 A1 6/2017
WO 2020043592 A1 3/2020
WO 2020043606 A1 3/2020

* cited by examiner

RADIO FREQUENCY SENSING SYSTEM

CROSS-REFERENCE TO PRIOR APPLICATIONS

This application is the U.S. National Phase application under 35 U.S.C. § 371 of International Application No. PCT/EP2022/051352, filed on Jan. 21, 2022, which claims the benefit of U.S. Provisional Patent Application No. 63/141,250, filed on Jan. 25, 2021 and European Patent Application No. 21154653.6, filed on Feb. 2, 2021. These applications are hereby incorporated by reference herein.

FIELD OF THE INVENTION

The invention relates to a radio frequency sensing system and a radio frequency sensing method. The invention relates further to a computer program product for calibrating the radio frequency sensing system.

BACKGROUND OF THE INVENTION

Smart and connected light modules communicate with each other e.g. by means of exchanging wireless signals. Apart from their primary function of providing lighting the light modules can execute secondary functions that extend beyond this ordinary function of providing light. For example, the exchanged wireless signals in the radio frequency (RF) range can be used in a sensing function, which includes multiple mechanisms for collecting motion information. Such a sensing function can usually be integrated into a given hardware architecture easily, since usually no hardware components are required other than those already included in light modules allowing for wireless communication anyway. Hence, a sensing function can usually be implemented on a purely software basis, by only changing the way the wireless signals are transmitted and received using the given hardware and the way the signals are processed to deduce information about a presence and/or motion. This allows for a cost-effective implementation of sensing in already installed smart and connected light modules.

Implementing a sensing function on wirelessly connected light modules will typically create a distributed sensor, i.e. a sensing network where the light modules are densely distributed over common professional or residential spaces such as offices, living rooms and bed rooms, etc. The sensitivity and accuracy of the network will generally rise with increasing density of the network, i.e., for instance, with the amount of light modules located in a given space. This is because the reliability of the signals transmitted and received by the different light modules and the information derived therefrom will generally increase with decreasing distance between the light modules. On the other hand, this will also increase the complexity of the entire system.

US 2020/0096345 discloses a cognitive fingerprinting for indoor location sensor networks. In a training phase a user is instructed to walk around an area of interest and to use an interface to annotate the location sensor readings with X, Y location.

SUMMARY OF THE INVENTION

It is an object of the present invention to provide a RF sensing system, a RF sensing method and a computer program product that allow for a convenient and time efficient calibration of the radio frequency sensing system by a user.

A RF sensing system is provided. The RF sensing system can be implemented as a lighting system. It can be used for motion or activity sensing. The RF sensing system comprises a plurality of RF sensing nodes placed in a sensing area. The plurality of RF sensing nodes comprise a first plurality of sensing nodes. Each first RF sensing node can comprise a RF node transceiver, a node controller with a RF sensing controller for sensing RF signals from other RF nodes, for determining signal quality parameters or for performing a combination thereof (configured to sense RF signal and to determine signal quality parameters). The RF sensing system furthermore comprises a controller with a transceiver, and a mode controller having an operation mode controller and a calibration mode controller. In a calibration mode, the calibration mode controller is configured to analyse metadata from the plurality of sensing nodes to select or pre-select a number of sensing nodes from among the plurality of sensing nodes for performing RF motion sensing in or for a sensing area. The calibration mode controller outputs instructions to (a user interface of) a user device to instruct a user to perform activities or movements in the sensing area to enable a calibration of the RF sensing nodes by analysing the RF signals detected by the RF sensing nodes or by the pre-selected RF sensing nodes during the activities or movement of the user in the sensing area.

According to an example, the metadata include at least one of naming information of the RF sensing nodes, a type of RF sensing nodes, positions of the RF sensing nodes, and relative positions of the RF sensing nodes. The calibration mode controller can analyze the metadata of the RF nodes and perform a pre-selection from among the plurality of RF nodes based on the analysis. Hence, the metadata is used to improve the calibration process.

According to an example, the calibration mode controller outputs instructions to (a user interface of) the user device to instruct a user to perform an activity or movements in the sensing area based on the analyzed metadata. The instructions can be visual and/or audio instructions. The detected RF signals can be used to calibrate to RF sensing system and in particular for detecting the specific activity or movements.

According to an example, the calibration mode controller extracts contextual information from the analyzed metadata and uses the contextual information in the pre-selection of the RF sensing nodes and the instructions outputted to the user device.

According to an example, the calibration mode controller verifies the extracted contextual information on consistency and plausibility.

According to an example, the calibration mode controller generates augmented reality assisted instructions for the user to perform activities or movements during the calibration process.

According to an example, the calibration mode controller is configured generate instructions or augmented reality assisted instructions for the user to perform movements or activities with the user device to determine metadata of the RF nodes during the calibration process.

According to an example, the calibration mode controller generates instructions or augmented reality assisted instructions for the user to perform actions, activities or movements with the user device to optically determine metadata of the RF nodes during the calibration process.

According to an example, the calibration mode controller performs the pre-selection of the RF sensing nodes taking into account processing capabilities, internal metrics or parameters of the RF sensing nodes.

The RF nodes can have a primary function which is different from the motion sensing. The primary function can be to function as a lighting device. The secondary function of the RF nodes is then to perform motion sensing. The RF nodes will be placed in a sensing area at positions to enable their primary function like lighting. In other words, the positions of the respective RF nodes may be selected to satisfy its primary function. It should be noted that the positions of the RF nodes can be less than optimal for the secondary function of motion sensing.

According to an example, a calibration is performed to enable an improved motion or activity sensing by means of the RF nodes positioned within a sensing area or by means of RF nodes which are not directly in the sensing area. Optionally an automatic setup of the RF motion sensing system can be performed. Here, the controller can detect which RF sensing nodes are in the sensing area or in the detection area of the controller. The detection is performed by means of RF signals or RF messages between the controller and the RF nodes. In a next step, the setup can be refined by analysing metadata of the RF nodes. The metadata may include a name, a position and/or a type of node. In other words, the metadata can include information about the respective RF nodes. The metadata may hence include a name of a respective RF node. Such a name can be given to the RF node during the setup of the primary function of the RF nodes. The metadata of the respective RF nodes can be stored in the RF nodes or can be transmitted to the controller. Here, the metadata can be stored temporarily or permanently. The controller can analyse the metadata of the respective RF nodes and can select some of the RF nodes from among the plurality of RF nodes for motion sensing. As an example all of the RF nodes can be used for their primary function of providing lighting while only a sub-set of RF nodes are used for the secondary function of RF based motion sensing. The secondary function of the non-selected RF nodes can be deactivated or the controller may disregard any sensing signals or sensing messages from those non-selected RF nodes. Alternatively, the controller may deactivate the secondary function of the non-selected RF nodes such that they do not perform the sensing operation.

In addition, the controller may initiate a calibration mode during which the controller can forward information and instructions to a user device of a user to perform activities or movements like a walk-through through the sensing area. During the walk-through, the controller or the RF sensing nodes themselves detect the sensed RF signals and use the detected RF signals to improve the calibration of the sensing function.

Based on the detected RF signals during the calibration mode, the controller may also further select RF nodes from the plurality of RF nodes and disregard the secondary function of the non-selected RF nodes in order to further refine the calibration and the subsequent motion sensing. In other words, the selection of the RF sensing node can be performed in one step or in a two-step process Accordingly, the calibration process of the RF sensing system is improved while those RF nodes which do not contribute to the RF sensing can be deactivated for sensing or their RF sensing signals can be ignored by the controller. Hence, only those RF sensing nodes which actually do provide a positive contribution to the motion sensing in the sensing area may be used while the others can be disregarded. Thus, while improving the accuracy of the motion sensing, the complexity of the RF sensing system can be reduced.

The user device can be any device with a user interface like a smartphone, tablet, smart glasses, or a laptop.

In particular for a case where the RF nodes are implemented as smart lights, they are typically provided at existing light sockets or in form of lamps. The lamps are then arranged to enable their primary function, namely the lighting of a room. It should be noted that the chosen positions and types of the smart lamps may not correspond to the best positions for RF based motion sensing. During the calibration process, it must be determined which of the available RF nodes are suitable for RF sensing. Those RF nodes which are not selected will then be discarded, i.e. their signals will not be processed during the motion sensing or alternatively, they will not continue to forward their RF based sensing signals.

For example for a cost effective RF motion sensing system, is may also be possible to define or set a maximum number of RF nodes for the motion sensing. The maximum amount of RF nodes in the RF based motion sensing may be determined by the available RF bandwidth or by the available processing power of the controller in the RF motion sensing system.

Metadata that is used during the calibration process may include information regarding the environments of the sensing area, information regarding the RF nodes, information regarding the activity which is carried out by the user in the sensing area as well as the type of the desired sensing.

The RF sensing may include motion sensing, activity sensing, people counting and position detection. Motion sensing may include detection motion like a person moving in the sensing area, a person reforming activities, fall detection, breathing detection, gesture detection.

A transceiver can be a dedicated transmitter and a dedicated receiver such that the transceiver can send and receive signals at the same time. Alternatively, the transceiver can be implemented as a combination of the transmitter and a receiver, where the device can either send or receive signals at the same time.

The user device may comprise a user interface and a speaker. The user interface can be a display of a smart device like a smart phone. The display may be able to display augmented reality information and images. The user device may comprise or may be connected to a virtual reality device like virtual reality glasses or a virtual reality headset. The user device may comprise at least one camera and optionally a LiDAR sensor to be able to perform panoramic scans of the sensing area with the RF nodes to determine metadata of the sensing area and the RF nodes in the sensing area. The metadata may comprise information regarding a luminaire type of a RF node, their respective location in the room and the location of the RF node with respect to objects in the sensing area.

It shall be understood that the RF sensing system of claim 1, the RF sensing method of claim 10, and the computer program product of claim 14, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
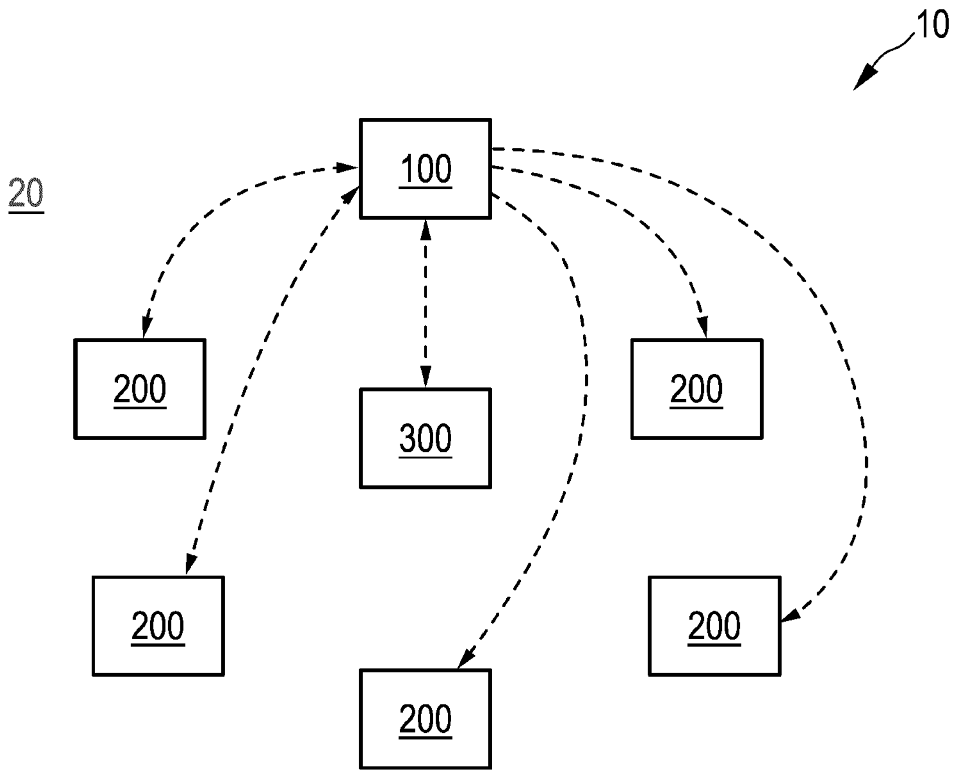
FIG. 1 shows a schematic representation of a RF sensing system.

FIG. 1 shows a schematic representation of a RF sensing system. The RF sensing system 10 comprises a controller 100 and a number of RF sensing nodes 200 within a sensing area 20. The sensing area 20 can be a room area or garden. The RF sensing system has a primary function which can for example relate to lighting. The RF nodes 200 can have light unit for providing lighting. As a secondary function, the RF sensing system is adapted to sense a motion in the sensing area 20. A user may have a user device 300 (with a user interface 310) capable of RF communication with the controller 100.

Figure 2:
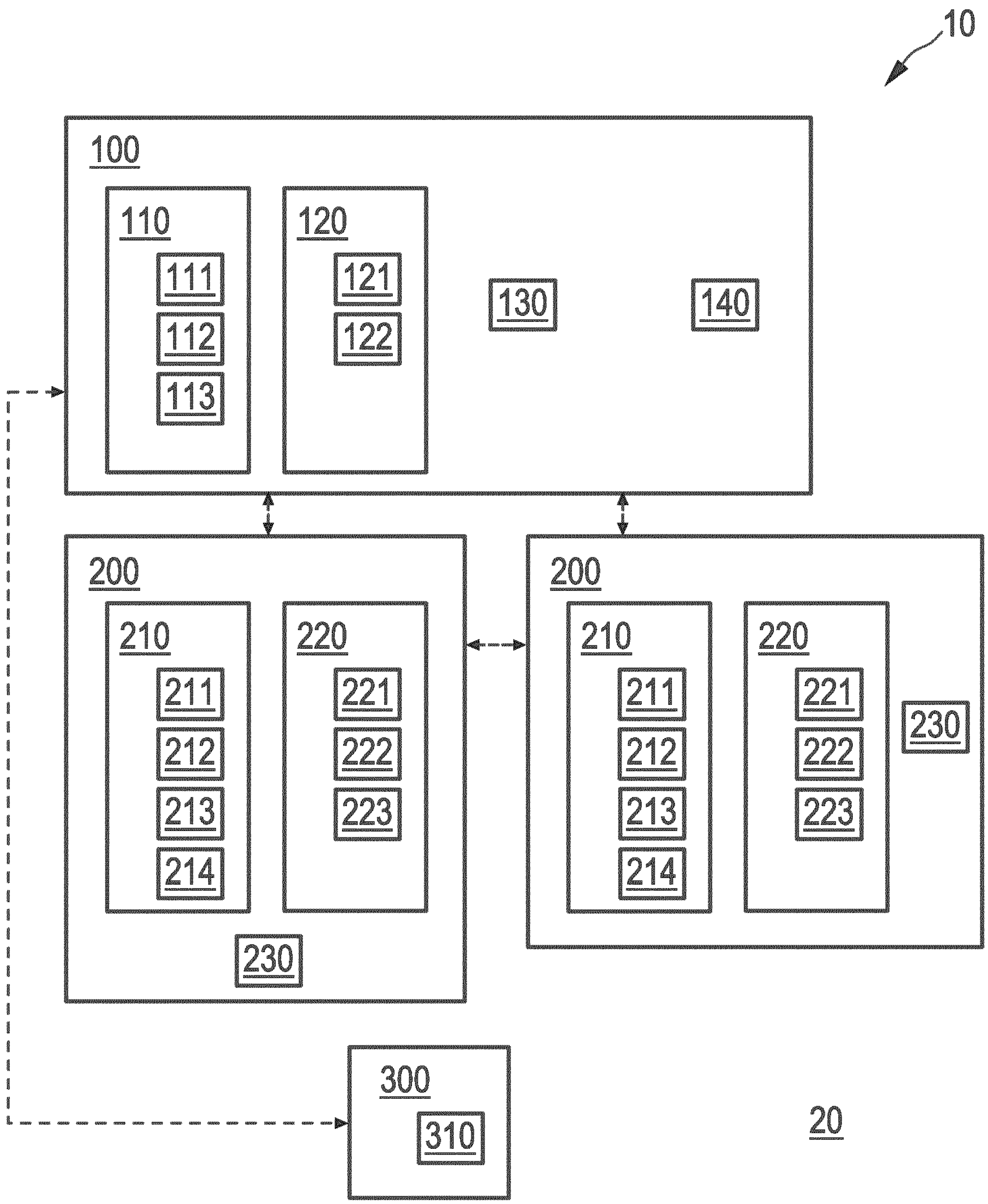
FIG. 2 shows a block diagram of a RF sensing system.

FIG. 2 shows a block diagram of a RF sensing system as shown in FIG. 1. The controller 100 comprises a transceiver 110 which is configured for a RF based communication. The transceiver 110 can comprise a first, second and third sub-transceiver for example for a ZigBee-based communication 111, a WiFi-based communication 112 or an LTE or 5G-based communication 113. The controller 100 comprises a mode controller 120. The mode controller 120 can have an operation mode controller 121 and a calibration mode controller 122. The operation mode controller 121 is used for a normal operation mode (motion sensing). The calibration mode controller 122 is used for performing a calibration of the system.

The controller 100 can also comprise a node metadata analyser 130 and optionally a memory 140. The memory 140 can be used to store metadata and parameters of RF nodes in the RF motion sensing system. The metadata and parameters of RF nodes in the RF motion sensing system can also be stored elsewhere in the system or in a remote location.

The plurality of RF nodes 200 may comprise a plurality of first RF nodes and optionally at least one second RF node, which may be different from the first RF nodes 200. For example the second node may only have a transmitter instead of a transceiver. Each first RF node 200 can be considered as a network device within a RF network system (RF motion sensing system) and is able apart from a primary function (e.g. lighting) to perform a secondary function like motion sensing. The first RF node 200 therefore can comprise a node transceiver 210. The node transceiver 210 can have sub-transceivers such as a ZigBee-based transceiver 211, a WiFi-based transceiver 212, an LTE or 5G-based transceiver 213. The node transceiver 210) can communicate with other node transceivers and/or with the transceiver of the controller. Furthermore, the transceiver 110 can comprise multiple antennas or a single antenna 114. Each first RF node can also comprise a node controller 220. The node controller 220 can comprise a node processor 221, a node memory 222 and an RF sensing controller 223. The RF sensing controller 223 can be used to sense RF signals from other RF nodes, to determine signal quality parameters or to perform a combination thereof, i.e. sense RF signal and determine signal quality parameters (like received signal strength indicator RSSI etc.). Furthermore, the first RF node 200 can comprise a primary function 230. Such a primary function 230 can be a smart light for providing lighting. The firsts RF nodes 200 are able to perform a primary function and a secondary function, namely a RF-based (motion) sensing. The RF based (motion) sensing is performed with the elements of the RF node which are also required for the primary function or for a communication to enable a primary function like a smart lighting. In particular, the secondary function of RF based motion sensing is performed by detecting RF signals or RF messages which are communicated among RF nodes or with the controller of the sensing system 10. Thus, the secondary function of the sensing system can be implemented without additional hardware in the RF nodes. In fact, only the RF signals and messages which are exchanged within the motion sensing system need to be analysed in order to perform the secondary function of motion sensing within the sensing area 20, where a plurality of RF nodes 200 are arranged.

A user may have a user device 300 with a user interface 310 and optionally a speaker and can move in the sensing area 20. Instructions from the controller to a user can be outputted via the speaker as audio signals or via the user interface 310.

The RF sensing may include motion sensing, activity sensing, people counting and position detection. Motion sensing may include detection motion like a person moving in the sensing area, a person reforming activities, fall detection, breathing detection, gesture detection.

A transceiver can be a dedicated transmitter and a dedicated receiver such that the transceiver can send and receive signals at the same time. Alternatively, the transceiver can be implemented as a combination of the transmitter and a receiver, where the device can either send or receive signals at the same time.

In the calibration mode and under control of the calibration mode controller 122, the calibration is performed in order to take account of the conditions in the sensing area. These conditions may include a relative location of the RF nodes 200 in the sensing area 20 as well as with respect to each other. Furthermore, the impact of the environment for example on the transmission properties like the channel properties of the RF link between RF nodes 200 can be taken into account. Moreover, the impact of a user moving within the sensing area and the impact of these movements on the sensing areas of the RF nodes 200 should also be taken into account during the calibration process. Accordingly, contextual information of the RF sensing system in the sensing area can be part of the input during the calibration process. This can be performed in order to improve the sensitivity of the RF motion sensing system. The additional contextual information can be used in the selection of some of the RF nodes from among the plurality of RF nodes in the RF motion sensing system.

Metadata of the RF sensing nodes 200 can be part of the contextual information may include information regarding the environments of the sensing area, information regarding the RF nodes, information regarding the activity which is carried out by the user in the sensing area as well as the type of the desired sensing.

The calibration mode can be selected by a user via the user device 300 or can be initiated by the controller 100. In the calibration mode, the calibration mode controller 122 controls the calibration process. During the calibration process, the controller 100 can output instructions via the transceiver 110 to a user interface 310 of a user device which the user follows to perform the calibration process for example by walking around the sensing area 20.

According to first example, the calibration mode controller 122 analyses the metadata of the RF sensing nodes 200. In particular, the calibration mode controller 122 can analyse the names or identifiers of the RF nodes 200 which have been assigned by the user during a set up proceeding. According to the first example, the RF nodes 200 can be implemented as smart lights having a lighting unit 230. Hence, the calibration mode controller 122 analysed the names or identification of the smart lamps (RF nodes) in the sensing area 20. In the first example, the sensing area 20 may have the following smart lights:

living room standing left
living room standing right
living room ceiling 1
living room ceiling 2
living room ceiling 3

The calibration mode controller 122 then analyses the identifications or names of the different lights to determine their significance for the RF sensing process. It has been noted that the names or identification of the different lamps may include contextual information regarding the position of the lamps as well as the type of the lamps. As in the first example, it can be concluded that the living room standing left light and the living room standing right light are most likely to be sufficiently apart from each other for an effective RF motion sensing. On the other hand, the living room ceiling 1 light, the living room ceiling 2 light and the living room ceiling 3 light can be considered as three lights which are probably very close to each other and can relate to three lamps within the same luminaire housing. Accordingly, it can be expected that the RF signals between the living room ceiling 1 (RF node), living room ceiling 2 (RF node) and living room ceiling 3 (RF node) may not have the same information as RF signals between the living room standing left and living room standing right lights. In other words, the RF signals between the three ceiling lights may not be important for the calibration procedure and possibly the subsequent RF motion sensing. Therefore, at least two of the ceiling lights may be discarded for the RF sensing purpose. Thus, according to the first example, the RF signals exchange between the living room standing left and the living room standing right lamps as well as the RF signals exchange between the living room standing left and one of the ceiling lamps as well as the RF signals exchange between the living room standing right and one of the ceiling room lamps can be selected during the calibration process. During the calibration process, only one of the three ceiling lamps can be selected while the other two can be discarded in the subsequent motion sensing operation. Hence, a first preselection of the available RF nodes can be performed based on contextual information contained in the name or identification of the lamps within a sensing area. The preselection can be performed before or during a walk-through of a user through the sensing area, wherein the user follows instructions received by the controller 100. A subsequent additional selection from among the RF nodes 200 may be performed during or after the calibration process.

For example, a controller may forward instructions to the user interface 310 such as: walk in between lights living room standing left, living room standing right and living room ceiling.

By the selection of only one of the three ceiling lights, the complexity of the subsequent RF motion sensing can be reduced as from the available five lamps according to the first embodiment, only three are selected while the other two (two of the three ceiling lamps) are discarded only for the secondary purpose of motion sensing. Moreover, by reducing the overall number of selected RF nodes for the subsequent RF motion sensing, the calibration procedure can be improved and the coverage can be improved such that the final assignment of the selected lamps can be made faster such that the overall calibration procedure is faster which should improve the customer acceptance.

Furthermore, during the calibration procedure or during the preselection of the respective RF nodes, a relative position detection of the RF nodes in the sensing area can be performed. This can be achieved by determining the signal strength of the signals between the RF nodes. Moreover, for a 60 GHz WiFi application, the spatial relation among the RF nodes (lighting units) can be determined. The 60 GHz WiFi environment may determine that seen from a first light, two other lights in the rooms are at 180° angle to each other. Hence, it can be concluded that this light is located in a linear line between two other lights. This may also be taken into account by the calibration mode controller 122.

In a second example, the metadata of the RF nodes 200 like the names or identification of the respective RF nodes can be used and analysed to extract contextual information. Here, information regarding the sensing room or sensing area can be extracted. Hence, naming analytics are performed to extract contextual information. For example, if four lights are present in the sensing room and have the following names:

Couch left
Couch right
TV left
TV right

This naming information can be analysed and information of the environment sensing area can be extracted. For example, it can be extracted that a couch as well as a TV is present in the sensing area and that two lights are arranged on both sides of the couch and two lights are arranged at both sides of the TV. If two lights are arranged on both sides of a TV, it may be expected that a user will not walk between these two lights as the TV will be in the way. Similarly it may be expected that if two lights are arranged on both sides of a couch, that it may be difficult for a user to walk between these two lights. Therefore, a preselection from among the available RF nodes may be performed based on these contextual information. For example, the RF signals between the TV left light and the TV right light may not contain valuable information and therefore may be discarded or not used during the calibration and the subsequent RF motion sensing operation.

In addition, the extracted contextual information may also be used during a calibration walk-through of the user. It may not make sense to instruct the user to walk between the TV left light and the TV right light. Accordingly, the instructions for the walk-through calibration that are sent by the calibration mode controller 122 can be influenced by the name or the identification of the RF nodes.

In the second example, the calibration mode controller 122 may issue instructions to the user via the user interface 310 of the user device 300 for the user to sit down on the couch in different positions like left, right and middle and walk from the couch towards the television and/or to walk between the couch and the television.

The calibration mode controller 122 can thus be used for naming analytics to identify the preferred RF nodes 200 which are used for the RF based motion sensing. Based on the naming analytics, a preselection of the available RF nodes 200 can be performed for calibration and/or the subsequent motion sensing.

In a third example, the available metadata of the RF motion sensing nodes 200 may include names or identifications of the RF nodes as well as the type of RF nodes like the type of the lighting unit (candle or bulb). In the third example, the lights in the sensing area could be:

dining ceiling 1—type candle
dining ceiling 2—type candle
dining ceiling 3—type candle
dining wall 1—type luminaire
dining wall 2—type luminaire
dining wall 3—type luminaire Accordingly, the RF nodes (lamps) 200 in the sensing area 20 can be three candle lamps and three luminaires. Now this information can be analysed to extract contextual information in particular regarding the spatial relationship between the different lights. Moreover, naming analytics can be performed to determine whether the naming information can make sense and is not distorted. The reason behind this is that often during the initial set-up of the lightings in the sensing area, users are too lazy to refer to the respective lightings with proper names. Instead, the users may use the same names only differentiating the names with the numbers at the end like dining ceiling 1, dining ceiling 2, dining ceiling 3. Hence, it must be determined whether the names associated to the different RF nodes (lighting units) contain actual contextual information. In the third example, if only the names of the RF nodes (lights) are analysed, it may be determined that there are three lights arranged close to each other (dining ceiling 1, dining ceiling 2, dining ceiling 3) and that there is a second set of lights, namely dining wall 1, dining wall 2, dining wall 3 such that the system may come to the conclusion that only two sets of lights are present in the sensing room wherein each set of light is arranged close to each other.

In order to determine whether or not the names or information referring to the different RF nodes (lights) are containing valuable contextual information, other tests may be required to determine the spatial relationship between the different RF nodes (lights). In the third example, it should be noted that it is general lighting application knowledge that wall light luminaires are known to be single lamp luminaires and are unlikely to be grouped whereas ceiling candles are likely to be part of a single luminaire like a candela. Accordingly, in the third example, it may be determined that the three dining ceiling lamps are arranged very close to each other such that only one of the three dining ceiling lights should be selected as active RF sensing node, wherein it is expected that the three dining wall lamps are arranged at a distance from each other such that they can all be among the preselected RF nodes for the calibration process and possibly the subsequent RF based motion sensing. In addition, also the RF signals exchanged between the different RF nodes can be analysed to determine for example their signal strength and to extract spatial information from these parameters.

In a fourth example, in an office environment the following lights may be present with the following names:

office wall
office desk
office standing
office downlight
office strip

From name analytics it can be determined that contextual information regarding the expected location of the RF nodes (lights) can be extracted. Based on this expected location information, a preselection of the available RF nodes (lights) can be performed in order to improve the RF sensing data. In the fourth example, it may be concluded that the wall, desk and standing lights are surrounded by free air or a less RF dampening surrounding such that good RF signals can be expected. On the other hand, the downlight and the strip light may be expected to be embedded in the ceiling or surrounded by furniture such that the dampening of their RF signals may be more than that of the other lights. Hence, the downlight and the strip light may be one of the lights that are non-selected for the calibration process and a subsequent RF motion sensing. In the fourth example, the calibration mode controller 122 may issue instructions to the user via the user interface 310 to walk around the office wall light, the office desk light, and the office standing light. During the walk-through, the RF signals of these three lights can be analysed to determine whether or not the RF signals have sufficient strength or quality to perform an RF motion sensing with these signals. Optionally, the RF signals from the other two lights, namely the office downlight and the office strip, can also be examined to determine whether or not they contain valuable information or not. Based on the result, these lights may be selected or non-selected lights.

In a fifth example, which can be based on any of the previous examples, an augmented reality AR can be used on the user interface during a walk-through in the calibration process. Thus, AR assisted instructions can be generated by the controller 100 and be given to the user via the user interface 310. In the fifth embodiment, the name or identification of the RF nodes (lights) in the sensing area 2 can be used to improve the walk-through instructions for the user during the calibration process. The naming analytics can be used to determine a type of light and a possible position of the type. This information can be used by the AR assisted walk-through as the expected light and the expected position may be displayed on the user interface 310 of the user device 300. In addition, arrows or other symbols may be displayed to assist the user with a guided walk-through of the sensing area 220 during the calibration procedure. For example, as in the fourth example, the user may be guided to walk around the office wall light, the office desk light and the office standing light as a camera of the user device detects the environment and arrows or other symbols are projected onto the display and over the video of the surrounding. It is expected that this will greatly improve the acceptability of a walk-through calibration On the user device 300 (like a smartphone, tablet, laptop etc.), a configuration or calibration app can be present. This app can communicate with the controller 100 to receive instructions for walk-through to enable a calibration of the RF motion sensing system. The app may activate a camera of the user device and may superimpose AR information on the video or photo image generated by the camera. This superimposed information may relate to symbols for guiding a user through a walk-through during the calibration. In addition, the augmented reality can be used to activate lights in the sensing area and to thereby locate the positions of the lights in the area on the camera image.

As mentioned in the first, second, third or fourth example, the names and identification of the RF nodes (lights) can be analysed through extract contextual information. As an example, the room may only have a single luminaire. In such a case, the app on the user device or the controller 100 can locate a ceiling light 1 and a dining wall light 1 light on the camera image and a superimposed AR image. If multiple lights of a type are located in a single room, the app may infer to the schematics of the naming and the most likely location (extracted from the name analytics). In addition or alternatively, the app or the controller may switch on the light of one of the RF nodes such that the user can identify this specific light and for example point the camera of the user device towards the light. Here, the sensors of the user device may be used to determine a direction or position of the selected and activated light. Thus, the identification of the position of the respective lights can be improved. Optionally, the camera of the user device may be used to determine the distance between the camera and the activated light (RF node). This can, for example, be performed by using a LiDAR sensor in the camera or the user device.

The AR enabled app on the user device may instruct the user (based on instructions from the controller) to walk into the center of a room and to align the camera with the respective lights (RF nodes), wherein the user device detects the direction and distance of each light (RF node). Based on all of these measurements, the app or the controller may calculate a 3D model of the sensing area and the RF nodes inside this area. Thus a 3D model can be used to further preselect some of the present RF nodes for calibration and/or a subsequent RF based motion sensing.

In the fifth example, the images captured by the camera of the user device may be used to determine objects (like a couch or a TV) in the sensing area. Furthermore, the detected objects may be set into relation with the present RF nodes (like TV left, TV right, couch left, couch right) as described in the second example. This information can be input into the instructions for the walk-through of the user during the calibration phase. In particular, if certain objects have been detected by the camera of the user device, the walk-through may be adapted such that the user is not instructed to walk against objects (like a TV or a couch) in the sensing area. This allows a more secure walk-through of a user during the calibration phase as injuries can be avoided.

In addition, based on the analysis of the images taken by the camera of the user device, not only objects in the path of the walk-through of the user can be determined but also images in the vicinity of the RF nodes 200. In particular those objects can be identified, which could have a negative effect on the RF broadcasting or have a negative effect on RF broadcasting signals. Such objects may be metal objects etc. Furthermore, this information can be part of the preselection of those RF nodes which should be used during the RF motion sensing.

Furthermore, the AR enabled app on the user device can display on the user interface the walk-through path it wants the user to take when calibrating the RF motion sensing system. The AR app may also provide real-time feedback on the AR image on the user interface, in particular regarding an RF sensing coverage. Furthermore, a visual overview of the areas of the room which have already been covered by the walk-through test can be indicated. Moreover, the AR enabled app can display information regarding the RF sensing detection performance (weak sensing signal versus strong response on the areas of the room, for example, where the walk-through has been successfully performed).

The user device may comprise a user interface and a speaker. The user interface can be a display of a smart device like a smart phone. The display may be able to display augmented reality information and images. The user device may comprise or may be connected to a virtual reality device like virtual reality glasses or a virtual reality headset. The user device may comprise at least one camera and optionally a LiDAR sensor to be able to perform panoramic scans of the sensing area with the RF nodes to determine metadata of the sensing area and the RF nodes in the sensing area. Alternatively, the user device or the smart device may comprise a LiDAR sensor without a camera. The panoramic scans can also be performed only by the LiDAR sensor without using the camera. The metadata may comprise information regarding a luminaire type of a RF node, their respective location in the room and the location of the RF node with respect to objects in the sensing area.

In a sixth example, for example in the calibration mode, the sensing area can be analysed. Here, for example, the type of room where the sensing area is present should be determined. This can be performed by asking the user to identify the room via a user interface 310. In addition or alternatively, naming analytics of the RF nodes in the sensing area can be used to determine the type of room. For example, as in the example 1, based on the name analytics, it can be determined that the sensing area is present in a living room. In the third example, based on the naming analytics, it can be determined that the sensing area is in the dining room. In the fourth example, it can be determined based on the naming analytics that the sensing area is an office. Based on the result of the room determination, the controller 100 or the calibration mode controller 122 can forward instructions to the user interface 310 of a user to perform a walk-through. Here, the walk-through path will be different depending on the actual determined room. For example, a walk-through path in a sleeping room will be different from a walk-through path in a living room as typically different types of furniture are present in a sleeping room than in a living room. For example, if the sensing area is in a bedroom, the controller 100 or the calibration mode controller 122 will forward instructions to the user via the user interface to walk around the bed and spend some time laying on the bed, as these are two typical activities in the bedroom.

If the sensing area is in a hallway, the controller 100 can forward instructions to the user interface to instruct the user to enter and leave the hallway through as many connecting rooms as possible. Here, the hallway has the function of connecting different rooms. Therefore, the user is instructed to perform the typical activities in a hallway.

If the sensing area is in a kitchen, the controller 100 will forward instructions to the user interface 310 instructing the user to open and close cabinets or sit at the kitchen table. This is advantageous as it can allow a more accurate RF motion sensing.

Thus, according the sixth example, the user is instructed via the user interface to perform activities that are typical for the room where he is in.

Optionally, the user may be asked to re-perform the specific activities or spend more time performing the activities.

According to an example, the calibration proceeding may be stretched over a longer period of time to improve the calibration. Thus, for example, a daily routine of a user can be detected by performing the RF based motion detection for several days. Thereafter, the calibration mode can be initiated. Thus, the calibration can also be performed not at the beginning of the RF based motion processing, but after a time period to further improve the calibration.

In a seventh example, if the room type, where the sensing area is located, has been determined, the controller 100 can forward instructions to the user via the user interface 310 to instruct the user to perform typical and meaningful activities in the room to enable an improved calibration. If the sensing area is in a dining room, the controller can forward instructions to the user interface of the user device to instruct the user to perform typical activities in the dining room. For example, the user is asked to sit on the furthest opposite chairs like at both heads of the table. In the meantime, the RF signals detected by the RF nodes can be analysed to determine a best subset of RF nodes.

If the sensing area is in a bathroom, the user is instructed by the controller via the user interface 310 to perform typical activities like sitting on the toilet and standing in the shower, standing in front of the sink etc. In the meantime, the detective RF signals are analysed.

If the sensing area is in a living room, the user is asked to perform typical activities.

If the RF motion detection system is to be used as an intruder detection, the user is instructed by the controller via the user interface 310 to walk along a possible entry path of an intruder like windows and a door leading into the garden.

In an eighth example, the controller 100 can analyse internal metrics or parameters of the RF nodes 200. Such parameters may include the CPU power, the free memory, an end radio loading (streaming, routing messages to other nodes, etc.). This information can be used during a preselection from among the available RF nodes. The idea behind including this information in the preselection is that not all RF nodes may have the same processing capability. Preferably, those RF nodes should be selected for the calibration and/or RF based motion sensing which have sufficient CPU power, free memory and still available radio bandwidth. Accordingly, the internal matrix or parameters of the RF nodes can be further input during the preselection of the available nodes, during the calibration and/or during the RF motion sensing. This may be in particular advantageous if a number of RF nodes are present in a room which exceed the required number of RF nodes to perform an efficient RF based motion sensing. Thus, the information on the internal matrix and parameters of the RF nodes may be used during the preselection or the selection of the RF nodes. For example, if two or three nodes are available with similar RF sensing sensitivities, one of those nodes may be selected which has more CPU power available, more free memory or a reduced radio loading.

Accordingly, an RF node with fewer spare processing resources or which has a more critical link, for example, in a ZigBee network topology, such RF node can be removed from the active RF motion sensing. Hence, according to the eighth example, additional information can be performed which is useful during a preselection or a selection of those RF sensing nodes which are actually used afterwards in the RF motion sensing system.

Optionally, a further walk-through of the user can be instructed by the controller 100 via the user interface 310 after the preselection of the available RF nodes has been performed. This subsequent walk-through can be used to verify whether the preselection has no negative influence on the sensitivity of the RF motion sensing system. If it is, however, determined that the sensitivity is not sufficient, the preselection or the selection of the RF nodes can be performed again.

In a ninth example, to further improve the RF motion sensing sensitivity, the controller 100 or the calibration mode controller 122 can determine in which room the sensing area is present. This can, for example, be performed as explained above by means of naming analytics. Then the controller 100 may determine activities in the sensing area which can have a negative influence on RF signals and thus which can have a negative influence on the detection of the RF signals by the different RF nodes. Then, the controller forwards instruction to the user interface to instruct the user to perform these specific activities to detect the amount of negative influence of these activities on the RF based motion sensing.

As an example, if the sensing area is in a bathroom, the user may be asked to flush the toilet, turn on the shower, open sink faucets in the bathroom to determine their impact on the RF based sensing. As a further example, if the sensing area is in the kitchen, the user is asked to turn on different electric or electronic equipment in the kitchen like the oven, the fridge, the microwave, etc. Furthermore, the user may also be asked to open and close the door of the oven, the fridge and the microwave to determine the negative influence of these activities on the RF signals received by the different RF nodes.

The results of these calibration steps may influence the selection of the RF nodes and the overall result of the RF based motion sensing. Furthermore, this information may be used in the preselection from among the available RF nodes.

In the tenth embodiment, the user may be instructed by the controller 100 via the user interface 310 to perform activities which are not among the usual activities but which should be detected. An example of such an abnormal activity is a falling of a person or if a person has fallen asleep, for example, in the living room and has not moved significantly in a last hour or so.

As an example, the controller 100 may instruct the user via the user interface 310 to simulate, for example, a falling down by sitting down or laying down, for example, in specific areas where a falling down is more likely.

As an example, a fall detection mode may be available in the controller which can be activated during a usual RF based motion sensing. During the fall detection, the system can detect any abnormal activities or a lack of activities in a room when just a moment ago there were activities. If a fall has been detected, the controller may issue a warning. The user device, which the user is carrying during the calibration process, may have sensors for detecting a motion. The data from this user device may be shared with the controller to align the RF sensing with the motion sensing by the user device, for example, to improve the calibration for a fall detection.

According to a further example which can be based on any of the previous examples metadata of RF nodes e.g. with light units may include information on the hierarchical structure within the primary function of the RF nodes system (like a lighting system). Here, a sensing area can be selected automatically based on those devices that belong to a certain hierarchical structure e.g. the lighting system. For example, in such a lighting system, the user can group lights into rooms. When enabling the sensing functionality, the user can indicate that they want to have sensing enabled in the bedroom (as opposed to the living room). The system would automatically know which lights are the lights in the bedroom and are therefore the ones that are at least upfront candidates for performing the RF sensing. The plurality of RF nodes in question can thus be determined. A preselection of the RF nodes for the RF sensing and a calibration can be performed as described above.

According to a further example a sensing area e.g. in an apartment may consist of a living room and an open kitchen. The user may want to have RF sensing only in the living room. However, the RF sensing may also utilize a light from the kitchen (while there is no RF sensing of the kitchen going on). Similarly, in a first bedroom the number of available Rf nodes may not be sufficient to perform an effective RF sensing, the system may then deduce from the naming information that the room (e.g. named by the user in the configuration app "bedroom kid" is adjacent to the "master bedroom" and hence tries to include a light from the bedroom-kid in the RF sensing for the master bedroom. Hence, RF nodes which are not directly arranged in the sensing area may also be included in the selected RF nodes for RF sensing, if they are able to provide additional or indirect information for the RF sensing.

According to an example, an augmented reality app runs on a user device and may be also used to provide not just instructions to the user but also give him feedback. For instance, while a walkthrough of the room is performed, the AR app may also show the quality of the sensor coverage e.g. overlaying a first colour like green for marking a subspace as having good sensor coverage as determined by the already performed portion of the walkthrough. A spot with suboptimal sensing coverage may be marked with a second colour like red in the AR app and an area requiring an additional second walkthrough pass can be marked checkered or have other markings.

The RF motion sensing system can be considered as a RF sensing network comprising a plurality of network device adapted to transmit and receive radio frequency signals, i.e. wireless signals constituted by electromagnetic radiation in the radio frequency range. Preferably, the RF sensing network comprises at least three of such network devices, wherein each of the network devices is adapted to transmit RF signals to at least one, preferably more, and most preferably all, of the other network devices, and is adapted to receive radio frequency signals transmitted by one of the network devices. The sensing network may be understood as a system comprising at least three network devices. Hence, it may also be understood as a non-local sensor. A network device can be any device having a network device communication capability. A network device communication capability can receive and transmit wireless signals, particularly radio frequency signals, and/or wired signals. For instance, the network device communication capability can comprise a network device transceiver for receiving and transmitting radio frequency signals, or a transmitter for transmitting radio frequency signals and a receiver for receiving radio frequency signals. In particular, a network device can be any smart device, i.e. a device comprising a communication capability for receiving and transmitting wireless signals, particularly RF signals, but which otherwise fulfils the functions of a corresponding conventional device. In particular, such a smart device may be a smart home device, in which case the corresponding conventional function would be that of a conventional home device, like a lamp or a home appliance. In a preferred embodiment, the network device is a smart light module, a smart plug or a smart switch.

For example, the exchanged wireless signals in the RF range can be used in a sensing function which includes multiple mechanisms for collecting information about a presence and/or motion of human beings, particularly about a number of people being present, a person falling, a person making a certain gesture or human breathing taking place, as a result of the impact their bodies have on the exchanged wireless signals. Such a sensing function can usually be integrated into a given hardware architecture easily, since usually no hardware components are required other than those already included in light modules allowing for wireless communication anyway. Hence, a sensing function can usually be implemented on a purely software basis, by only changing the way the wireless signals are transmitted and received using the given hardware and the way the signals are processed to deduce information about a presence and/or motion. This allows for a cost-effective implementation of sensing in already installed light modules.

According to an example criteria and mechanisms for determining optimal ways for a user to perform a walkthrough test in a space for selecting and/or calibrating nodes in an RF Sensing system is provided. In addition, augmented reality AR can be leveraged to simplify the RF sensing calibration.

It was noted that not all RF sensing capable nodes within a space are suitable for sensing due to either relative sensing performance or exceeding resource footprints. Hence, determining the most optimal sensing nodes, especially for advanced sensing like breathing detection, might only be possible involving the user, as only the user himself can provide proper contextual information about the space or can dynamically trigger with his body during the calibration the sensing system in order to identify the most affected pairs of nodes.

In an example, an augmented reality AR-assisted application on a smart device is used to identify suitable lights for RF sensing as well as visualizing to the user performing the RF sensing calibration the requested walk-through path in the building space.

Hence, a user can achieve an immediate, first time right deployment of RF Sensing with acceptable performance without requiring many iteration or needing long periods of (offline) training of the RF sensing before activating the system. In addition, for more advanced RF sensing use cases, such as breathing and heart rate detection, likely a guided calibration of the system may be required due to high sensitivity to the environment surrounding the detection area.

Other variations to the disclosed embodiments can be understood and effected by those skilled in the art in practicing the claimed invention, from a study of the drawings, the disclosure, and the appended claims.

In the claims, the word “comprising” does not exclude other elements or steps, and the indefinite article “a” or “an” does not exclude a plurality.

A single unit or device may fulfill the functions of several items recited in the claims. The mere fact that certain measures are recited in mutually different dependent claims does not indicate that a combination of these measures cannot be used to advantage.

Procedures like the processing of the detection signals for motion detection performed by one or several units or devices can be performed by any other number of units or devices. These procedures, particularly the control of the motion sensing system in accordance with the motion sensing method carried out by the RF motion sensing system, can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A radio frequency (RF) sensing system, comprising a plurality of RF sensing nodes, the plurality of sensing nodes having a plurality of first sensing nodes, each of the plurality of first RF sensing nodes having an RF node transceiver and a node controller with an RF sensing controller configured to sense RF signals from other RF nodes or to determine signal quality parameters or perform a combination thereof each of the plurality of first RF sensing nodes having a primary function different from RF sensing and a secondary function of RF sensing, and a controller comprising a transceiver, a mode controller having an operation mode controller, and a calibration mode controller, wherein in a calibration mode, the calibration mode controller is configured (i) to analyze metadata from the plurality of RF sensing nodes, the metadata including naming information of the plurality of RF sensing nodes, (ii) to extract contextual information about the sensing area from the analyzed naming information, and (ii) to select a number of RF sensing nodes from among the plurality of RF sensing nodes for performing RF sensing in a sensing area based on the analyzed metadata and the extracted contextual information, wherein the calibration mode controller is configured to output instructions based on the extracted contextual information to a user device to instruct a user to perform activities or movements in the sensing area to enable a calibration of the RF sensing nodes by analyzing the RF signals exchanged between the RF sensing nodes and detected by the RF sensing nodes during the activities or the movements of the user in the sensing area, and wherein the RF signals exchanged between the RF sensing nodes are affected by the activities or the movements of the user in the sensing area.

2. The radio frequency sensing system according to claim 1, wherein, the metadata include at least one of naming information of the RF sensing nodes, type of RF sensing nodes, position of the RF sensing nodes, and relative position of the RF sensing nodes, wherein the calibration mode controller is configured to analyze the metadata of the RF nodes and to perform a pre-selection from among the plurality of RF nodes based on the analysis.

3. The radio frequency sensing system according to claim 2, wherein the calibration mode controller is configured to output instructions to the user device to instruct a user to perform an activity or movements in the sensing area based on the analyzed metadata.

4. The radio frequency sensing system according to claim 2, wherein the calibration mode controller is configured to extract contextual information from the analyzed metadata and to use the contextual information in the preselection of the RF sensing nodes and for the instructions outputted to the user device.

5. The radio frequency sensing system according to claim 4, wherein the calibration mode controller is configured to verify the extracted contextual information on consistency and plausibility.

6. The radio frequency sensing system according to claim 1, wherein the calibration mode controller is configured to generate augmented reality assisted instructions for the user to perform activities or movements during the calibration process.

7. The radio frequency sensing system according to claim 1, wherein the calibration mode controller is configured generate instructions or augmented reality assisted instructions for the user to perform movements or activities with the user device to determine metadata of the RF nodes during the calibration process.

8. The radio frequency sensing system according to claim 1, wherein the calibration mode controller is configured to generate instructions or augmented reality assisted instructions for the user to perform actions, activities or movements with the user device to optically determine metadata of the RF nodes during the calibration process.

9. The radio frequency sensing system according to claim 1, wherein the calibration mode controller is configured to perform the pre-selection of the RF sensing nodes taking into account processing capabilities, internal metrics or parameters of the RF sensing nodes.

10. The radio frequency sensing system according to claim 1, wherein the calibration mode controller is configured to determine a type of room in which the sensing area is located based on naming analytics applied to the naming information of the RF sensing nodes, and to generate the instructions outputted to the user device based on the determined type of room such that the activities or movements correspond to typical activities for the determined type of room.

11. The radio frequency sensing system according to claim 1, wherein the calibration mode controller is configured to detect one or more objects present in the sensing area based on image data received from the user device during the calibration mode, and to adapt the instructions outputted to the user device such that the user is not instructed to walk against the detected one or more objects during the activities or the movements.

12. The radio frequency sensing system according to claim 1, wherein when a number of RF sensing nodes available in the sensing area is determined to be insufficient for the RF sensing, the calibration mode controller is configured to include in the selected number of RF sensing nodes at least one further RF sensing node located outside of the sensing area but in a space adjacent to the sensing area, the at least one further RF sensing node being identified based on the naming information of the RF sensing nodes.

13. Radio frequency sensing system according to claim 1, wherein the calibration mode controller is configured to perform the calibration over a period of multiple days during which a daily routine of the user is detected by the RF sensing nodes, the calibration mode controller using the detected daily routine to refine at least one of the selection of RF sensing nodes and the instructions outputted to the user device.

14. Radio frequency sensing method in an RF sensing system, the RF sensing system having a plurality of RF sensing nodes, the plurality of sensing nodes having a plurality of first sensing nodes, each of the plurality of first RF sensing nodes having (i) an RF node transceiver, (ii) a node controller with a RF sensing controller configured to sense RF signals from other RF nodes or to determine signal quality parameters or to perform a combination thereof, and (iii) a controller, the controller having (a) a transceiver, (b) a mode controller having an operation mode controller, and (c) a calibration mode controller, and each of the plurality of first RF sensing nodes having a primary function different from RF sensing and a secondary function of RF sensing, the radio frequency sensing method comprising:

in a calibration mode, analyzing metadata from the plurality of RF sensing nodes, the metadata including naming information of the plurality of RF sensing nodes, to extract contextual information about the sensing area from the analyzed naming information and to select a number of RF sensing nodes from among the plurality of RF sensing nodes for performing RF sensing in the sensing area based on the analyzed metadata and the extracted contextual information, and outputting instructions based on the extracted contextual information to a user device to instruct a user to perform activities or movements in the sensing area to enable a calibration of the RF sensing nodes by analyzing the RF signals exchanged between the RF sensing nodes and detected by the RF sensing nodes during the movements of the user in the sensing area the RF signals exchanged between the RF sensing nodes being affected by the activities or the movements of the user in the sensing area.

15. The radio frequency sensing method according to claim 14, wherein the metadata include at least one of naming information of the RF sensing nodes, type of RF sensing nodes, position of the RF sensing nodes, relative position of the RF sensing nodes, wherein the calibration mode controller is configured to analyze the metadata of the RF nodes and to perform a preselection from among the plurality of RF nodes based on the analysis.

16. The radio frequency sensing method according to claim 14, further comprising the step of outputting instructions to a user interface of a user device to instruct a user to perform activities or movements in the sensing area based on the analyzed metadata.

17. The radio frequency sensing method according to claim 14, further comprising the step of extracting contextual information from the analyzed metadata and using the contextual information in the preselection of the RF sensing nodes and for the instructions outputted to the user interface.

18. A non-transitory computer-readable storage device with computer-executable instructions stored thereon for performing the method according to claim 14 when executed by a processor.

* * * * *